US010129619B2

(12) United States Patent
Chen et al.

(10) Patent No.: US 10,129,619 B2
(45) Date of Patent: Nov. 13, 2018

(54) RECEIVER

(71) Applicant: GOERTEK INC., WeiFang, Shandong (CN)

(72) Inventors: Gang Chen, WeiFang (CN); Linjin Mao, WeiFang (CN)

(73) Assignee: GOERTEK INC., Weifang, Shandong (CN)

( * ) Notice: Subject to any disclaimer, the term of this patent is extended or adjusted under 35 U.S.C. 154(b) by 0 days.

(21) Appl. No.: 15/745,583

(22) PCT Filed: Nov. 16, 2015

(86) PCT No.: PCT/CN2015/094683
§ 371 (c)(1),
(2) Date: Jan. 17, 2018

(87) PCT Pub. No.: WO2017/045260
PCT Pub. Date: Mar. 23, 2017

(65) Prior Publication Data
US 2018/0213310 A1 Jul. 26, 2018

(30) Foreign Application Priority Data

Sep. 15, 2015 (CN) ..................... 2015 2 0712371 U

(51) Int. Cl.
*H04M 1/03* (2006.01)
*H04R 1/02* (2006.01)
(Continued)

(52) U.S. Cl.
CPC .............. *H04R 1/02* (2013.01); *H04M 1/035* (2013.01); *H04R 1/2811* (2013.01); *H04R 9/025* (2013.01);
(Continued)

(58) Field of Classification Search
CPC .......... H04R 1/023; H04R 9/025; H04R 9/06; H04R 9/04; H04R 9/10; H04R 2400/11; H04R 2209/024; H04M 1/03
(Continued)

(56) References Cited

U.S. PATENT DOCUMENTS 8,437,493 B2    5/2013  Nho et al.
9,042,593 B2 *  5/2015  Matsunaga .............. H04R 1/06
                                                      381/386
(Continued)

FOREIGN PATENT DOCUMENTS

CN     102595262 A    7/2012
CN     202488627 U    10/2012
(Continued)

OTHER PUBLICATIONS

International Search Report, SIPO, dated May 25, 2016.

*Primary Examiner* — Jesse A Elbin
(74) *Attorney, Agent, or Firm* — Holzer Patel Drennan

(57) ABSTRACT

The present invention discloses a receiver comprising an outer housing that consists of a first housing, a second housing and a third housing fitting to each other from top to bottom. The third housing is an integral structure, and includes a magnetic conductive piece and a plastic piece integrally injection-molded therewith. The magnetic conductive piece is bonded and fixed with a magnet and a washer. The magnetic conductive piece, the magnet and the washer together form a magnetic circuit system of the receiver, and the third housing is fixed with the second housing by ultrasonic welding through the plastic piece. The receiver of the present invention can realize one-step assembly of the rear cavity housing of the product, simplify the production process of the product, save the production time, and further reduce the production cost of the product.

9 Claims, 3 Drawing Sheets

(51) Int. Cl.
*H04R 1/28* (2006.01)
*H04R 9/02* (2006.01)
*H04R 9/06* (2006.01)
*H04R 31/00* (2006.01)

(52) U.S. Cl.
CPC ............ *H04R 9/06* (2013.01); *H04R 31/006* (2013.01); *H04R 2209/024* (2013.01); *H04R 2400/11* (2013.01)

(58) Field of Classification Search
USPC .................... 381/416, 426, 431, 349, 345
See application file for complete search history.

(56) References Cited

U.S. PATENT DOCUMENTS

| | | | | |
|---|---|---|---|---|
| 2018/0070188 A1* | 3/2018 | Pöppel | .............. | B29C 45/14467 |
| 2018/0213329 A1* | 7/2018 | Kang | .................... | H04R 1/00 |
| 2018/0220234 A1* | 8/2018 | Matsunaga | .............. | H04R 9/02 |

FOREIGN PATENT DOCUMENTS

| | | | | |
|---|---|---|---|---|
| CN | 202587300 U | 12/2012 | | |
| CN | 103997709 A | 8/2014 | | |
| WO | WO-2010004815 A1 * | 1/2010 | ............... | H04R 1/22 |

\* cited by examiner

RECEIVER

TECHNICAL FIELD

The present invention relates to the technical field of electro-acoustics, in particular, to a receiver.

BACKGROUND

A receiver is a device that can realize electro-acoustic energy conversion, which is widely used in electronic terminal devices such as mobile phones and telephones. The conventional receiver structure generally includes a magnetic circuit system, a vibration system, and an outer housing which accommodates the magnetic circuit system and the vibration system. The outer housing usually comprises an upper housing, a middle housing and a lower housing adapted to each other. The receiver is divided into two cavities, i.e., a front acoustic cavity and a rear acoustic cavity, by the vibrating diaphragm of the vibration system, wherein the front acoustic cavity is generally the space defined by the vibrating diaphragm, the middle housing and the upper housing, and the rear acoustic cavity is generally the space defined by the vibrating diaphragm, the middle housing and the lower housing. The lower housing and the yoke of the magnetic circuit system forms the main rear cavity housing of the receiver product.

In the current traditional technical solutions, the lower housing is usually a plastic housing. During the assembly process of the product, firstly, the plastic lower housing needs to be fixed on the assembly of the middle and upper housings by ultrasonic welding, and then the yoke is bonded to the assembly of the middle and lower housings with glue. It's not difficult to see that the assembly process of the product cannot be completed in one step when the lower housing and the yoke are two separate components, and two steps are required to complete the assembly, which inevitably increases the processes and working hours in the production process, thereby leading to a rise in the production costs of the product. In view of this, it is necessary to provide a new type of structural design that integrates the rear cavity housing to achieve one-step assembly.

SUMMARY

The technical problem sought to be solved by the present invention is to provide a receiver, which can improve the structure of the yoke and the lower housing to make it is possible to complete the assembly of the rear cavity housing in one step, thereby simplifying the production process, saving working hours and saving the production cost.

In order to achieve the above objects, the present invention employs the following technical solutions: a receiver comprising an outer housing, wherein the outer housing comprises a first housing, a second housing and a third housing adapted to each other from top to bottom, wherein the third housing has an integral structure, and comprises a magnetic conductive piece and a plastic piece which is integral with the magnetic conductive piece through injection molding; a magnet and a washer are bonded and fixed to the magnetic conductive piece; the magnetic conductive piece, the magnet and the washer together constitute a magnetic circuit system of the receiver; and the third housing is fixed with the second housing by ultrasonic welding through the plastic piece.

As an improvement, the third housing has a rectangular frame structure, and four plastic pieces are located at four corner areas of the third housing respectively.

As an improvement, the third housing comprises a bottom wall and two side walls; the magnetic conductive piece of the third housing comprises a base portion and two side portions vertically extending from opposite sides of the base portion to a direction approaching the second housing; the plastic pieces are coupled between the base portion and the side portions, and the plastic pieces constitute the bottom wall of the third housing together with the base portion, and constitute the side walls of the third housing together with the side portions.

As an improvement, the receiver further comprises a vibration system; the vibration system comprises a vibrating diaphragm; the vibrating diaphragm divides the receiver into two cavities, i.e., a front cavity and a rear cavity; and a space defined by the vibrating diaphragm, the second housing and the first housing forms the front cavity; and a space defined by the vibrating diaphragm, the second housing and the third housing forms the rear cavity.

As an improvement, the magnetic conductive piece is made of stainless steel material.

As an improvement, the vibration system is fixed on the second housing; the vibrating diaphragm is a silicone film, and is integral with the second housing through injection molding.

As an improvement, a voice coil is bonded to a lower side of the vibrating diaphragm; a reinforcing part is further coupled to the lower side of the vibrating diaphragm; and the reinforcing part has a concave structure.

As an improvement, the magnet comprises a center magnet bonded to a center position of a surface of the magnetic conductive piece and a pair of edge magnets disposed at opposite sides of the center magnet; the washer comprises a center washer covering a surface of the center magnet and an edge washer covering surfaces of the edge magnets.

As an improvement, the first housing is coupled with a spring connected to an external circuit.

Compared with the prior art, in the receiver according to the present invention, the third housing is designed as an integral structure, and comprises a magnetic conductive piece and a plastic piece integrally injection-molded with the magnetic conductive piece, wherein the magnetic conductive piece is fixed with the magnet and the washer, and the magnetic conductive piece, the magnet and the washer together constitute the magnetic circuit system; and the third housing is fixed with the second housing by ultrasonic welding through the plastic piece. That is, in the present technical solution, the magnetic conductive piece of the magnetic circuit system and the lower housing in the traditional receiver structure are injection-molded into one component, so that the assembly process can be realized in one step, the production process of the product is simplified, the production time is saved, and then the production costs of the product is reduced.

Figure 1:
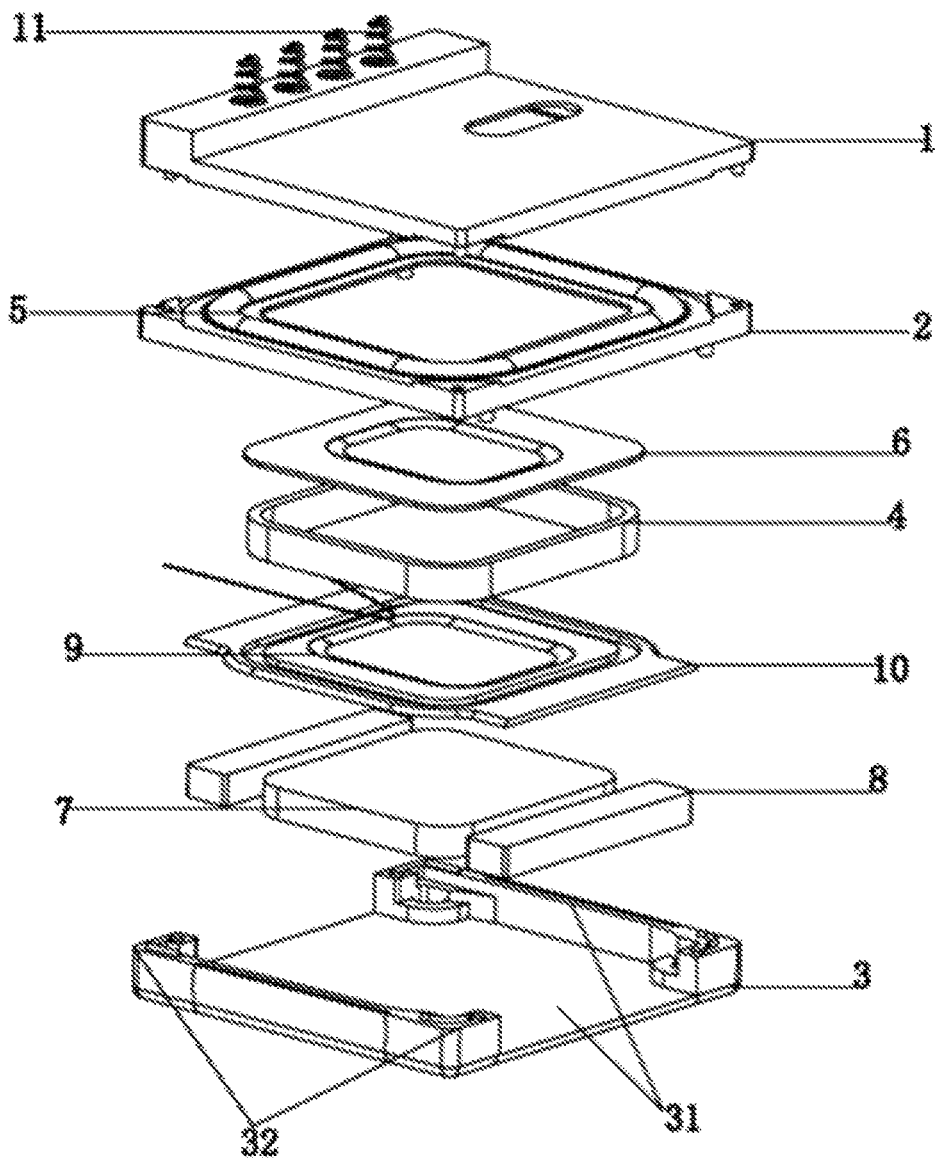
FIG. 1 is an exploded view of the receiver structure of the present invention.

The reference numerals comprise: first housing 1; spring 11; second housing 2; third housing 3; bottom wall 301; side wall 302; magnetic conductive piece 31; base portion 311; side portion 312; plastic piece 32; voice coil 4; vibrating diaphragm 5; reinforcing part 6; center magnet 7; edge magnet 8; center washer 9; edge washer 10.

DETAILED DESCRIPTION

Hereinafter, the contents of the present invention will be described in detail with reference to the accompanying drawings.

Referring to FIGS. 1, 3, 4 and 5 together, the receiver of the present invention comprises an outer housing, specifically, the outer housing comprises a first housing 1, a second housing 2 and a third housing 3 fitting to each other from top to bottom, and the first housing 1, the second housing 2 and the third housing 3 together define a cavity for accommodating a magnetic circuit system and a vibration system.

In the receiver of the present invention, the third housing 3 is an integral structure and comprises a magnetic conductive piece 31 and a plastic piece 32 integrally injection molded with the magnetic conductive piece 31, wherein the magnetic conductive piece 31 is bonded and fixed with a magnet and a washer. The magnetic conductive piece 31, the magnet and the washer together constitute the magnetic circuit system, while the plastic piece 32 plays a role similar to that of the lower housing in the prior art, that is, the third housing 3 is fixed with the second housing 2 by ultrasonic welding through the plastic piece 32; the vibration system comprises a vibrating diaphragm 5 and a voice coil 4 bonded and fixed with the vibrating diaphragm 5 (the voice coil 4 is specifically bonded and fixed at the lower side of the vibrating diaphragm 5); in order to further enhance the acoustic performance of the product at high frequency, the center portion of the vibrating diaphragm is further coupled with a reinforcing part 6.

Figure 5:
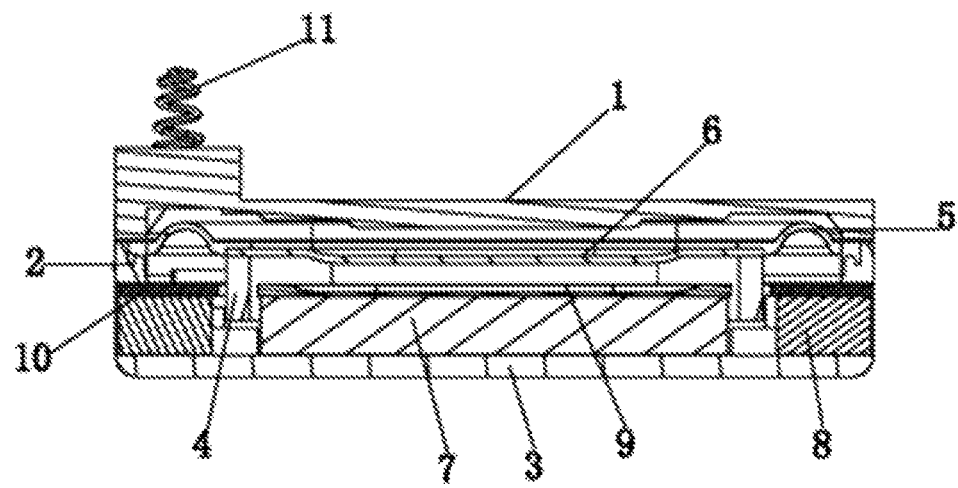
FIG. 5 is a cross-sectional view of the receiver structure of the present invention.

Refer to FIGS. 1 and 5, in the present embodiment, the magnet specifically comprises a center magnet 7 located at the center position of the magnetic conductive piece 31 and two edge magnets 8 disposed opposite to each other along a pair of opposite sides of the center magnet 7. The surface of the center magnet 7 is covered with a center washer 9, and similarly, the surfaces of the two edge magnets 8 are covered with an edge washer 10. Wherein the center magnet 7 and the edge magnet 8 are spaced apart from each other by a certain distance to form a magnetic gap, and the lower end of the voice coil 4 is accommodated in the magnetic gap. Since the receiver is provided with an electrical connection structure for connecting the internal circuit with the external circuit (for example, the spring shown by reference numeral 11 is used for connecting the external circuit), the electric signal of the external circuit is transmitted to the voice coil 4 through the electrical connection structure; under the action of the electromagnetic field, the voice coil 4 makes the movement of cutting magnetic field lines reciprocally and drives the vibrating diaphragm 5 connected with the voice coil 4 to vibrate, thus the sound waves are radiated to the external environment, and the conversion of the electroacoustic energy is completed.

According to the above technical solution, the existing separate structure of the magnetic conductive piece and the lower housing of the receiver is modified into integration of the two parties by integral injection molding, and the injection molding is performed in the shapes of the magnetic conductive piece 31 and the plastic piece 32 to form an integral third housing 3. In the process of product assembly, it doesn't need to be divided into two steps for assembling the lower housing and the magnetic conductive piece separately, but it can be completed in one step, thus simplifying the production process and saving production costs.

Figure 2:
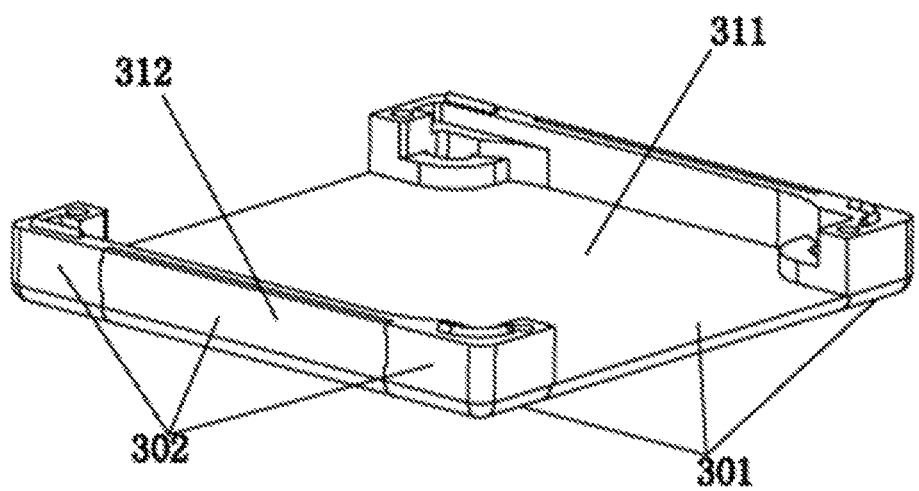
FIG. 2 is a perspective view of the structure of the third housing of the receiver of the present invention.
Figure 3:
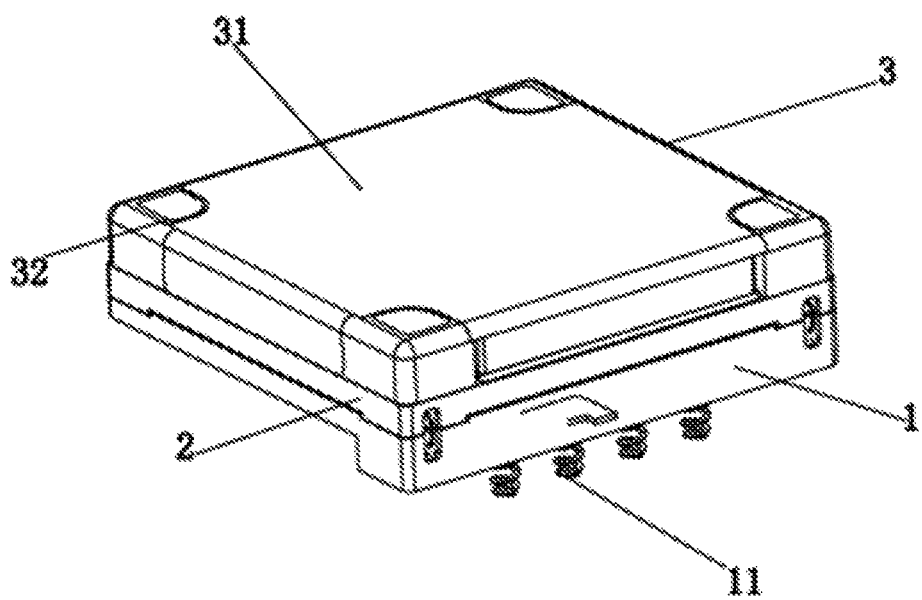
FIG. 3 is an external schematic view of the rear side of the receiver structure of the present invention.
Figure 4:
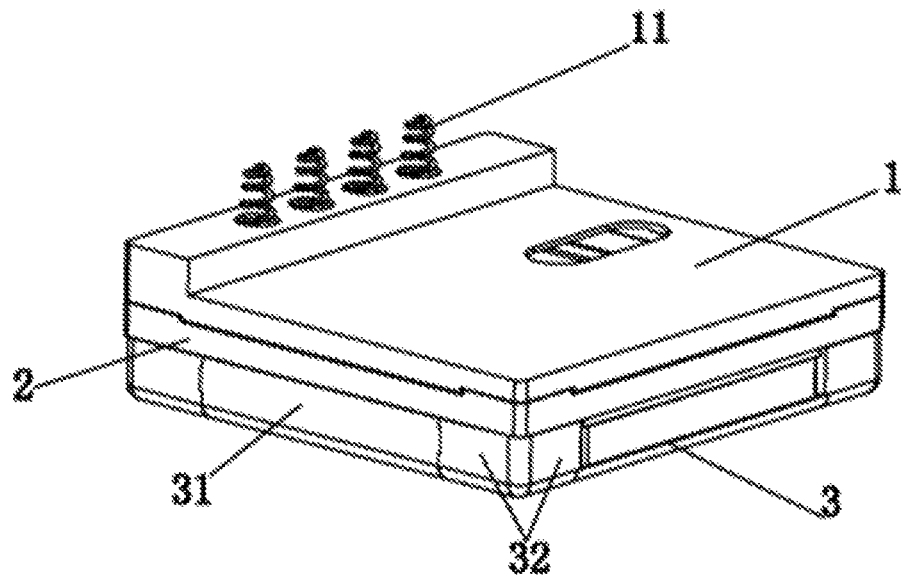
FIG. 4 is an external schematic view of the front side of the receiver structure of the present invention.

Specifically, referring to FIG. 2, the third housing 3 is a rectangular frame structure, and comprises a bottom wall 301 and two side walls 302, and the magnetic conductive piece 31 as a part of the third housing 3 comprises a base portion 311 and two side portions 312 formed by extending from a pair of opposite sides of the base portion 311 to the second housing 2 vertically. The plastic pieces 32 are located at the four corner areas of the third housing 3, and it can also be understood that the plastic piece 32 is coupled between the base portion 311 and the side portion 312 of the magnetic conductive piece 31, and the plastic pieces 32 and the base portion 311 of the magnetic conductive piece 31 constitute the bottom wall 301 of the third housing 3, and the plastic pieces 32 and the side portions 312 of the magnetic conductive piece 31 constitute the side walls 302 of the third housing 3.

Preferably, for the receiver as a whole, the vibrating diaphragm 5 divides the receiver into two cavities of a front cavity and a rear cavity; since the vibrating diaphragm 5 is fixed on the second housing 2, the space defined by the vibrating diaphragm 5, the second housing 2 and the first housing 1 forms the front cavity; and the space defined by the vibrating diaphragm 5, the second housing 2 and the third housing 3 forms the rear cavity. That is to say, the present technical solution makes the lower housing and the magnetic conductive piece (yoke) as the rear cavity housing in the prior art become an integral structure.

Preferably, the magnetic conductive piece 32 is made of stainless steel material.

Preferably, referring to FIG. 5, the vibrating diaphragm 5 according to the present embodiment is a silicone film and integrally injection-molded with the second housing 2. Since the silicone material itself has good compliance, temperature resistance and mechanical properties, on the one hand, silicone film employed by the present embodiment can effectively adjust the compliance of the suspension ring portion of the vibrating diaphragm and improve good listening rate of the product, on the other hand, silicone film has strong elasticity, which can increase the vibration amplitude of the vibrating diaphragm to a certain extent, while it is not easy to deform during the work, and it can overcome softening phenomenon in the suspension ring portion appeared due to temperature changes, and improve good rate of the product reliability.

Preferably, as shown in FIG. 5, in this embodiment, the reinforcing part 6 is coupled to the lower side of the vibrating diaphragm 5, and the reinforcing part 6 has a concave structure, which is beneficial to reduce the thickness of the product while enhancing the high frequency performance of the product.

The above-mentioned descriptions are only exemplary embodiments of the present invention and are not intended to limit the present invention. However, any equivalent modification or change made by those having ordinary skill in the art should be included in the protection scope of the appended claims.

What is claimed is:

1. A receiver, comprising an outer housing, wherein the outer housing comprises a first housing, a second housing and a third housing adapted to each other from top to bottom, wherein the third housing has an integral structure and comprises a magnetic conductive piece and a plastic piece which is integral with the magnetic conductive piece through injection molding; a magnet and a washer are bonded and fixed to the magnetic conductive piece; the magnetic conductive piece, the magnet and the washer together constitute a magnetic circuit system of the receiver; and the third housing is fixed with the second housing by ultrasonic welding through the plastic piece.

2. The receiver according to claim 1, wherein the third housing has a rectangular frame structure, and four plastic pieces are located at four corner areas of the third housing respectively.

3. The receiver according to claim 2, wherein the third housing comprises a bottom wall and two side walls; the magnetic conductive piece of the third housing comprises a base portion and two side portions vertically extending from opposite sides of the base portion to a direction approaching the second housing; and the plastic pieces are coupled between the base portion and the side portions, the plastic pieces constitute the bottom wall of the third housing together with the base portion, and constitute the side walls of the third housing together with the side portions.

4. The receiver according to claim 1, further comprising a vibration system, wherein the vibration system comprises a vibrating diaphragm; the vibrating diaphragm divides the receiver into two cavities, i.e., a front cavity and a rear cavity; and a space defined by the vibrating diaphragm, the second housing and the first housing forms the front cavity; and a space defined by the vibrating diaphragm, the second housing and the third housing forms the rear cavity.

5. The receiver according to claim 1, wherein the magnetic conductive piece is made of stainless steel material.

6. The receiver as claimed in claim 4, wherein the vibration system is fixed on the second housing; and the vibrating diaphragm is a silicone film, and is integral with the second housing through injection molding.

7. The receiver according to claim 6, wherein a voice coil is bonded to a lower side of the vibrating diaphragm; a reinforcing part is further coupled to the lower side of the vibrating diaphragm; and the reinforcing part has a concave structure.

8. The receiver according to claim 1, wherein the magnet comprises a center magnet bonded to a center position of a surface of the magnetic conductive piece and a pair of edge magnets disposed at opposite sides of the center magnet; the washer comprises a center washer covering a surface of the center magnet and an edge washer covering surfaces of the edge magnets.

9. The receiver according to claim 1, wherein the first housing is coupled with a spring connected to an external circuit.

* * * * *